United States Patent
Nagashima

(10) Patent No.: US 6,463,050 B1
(45) Date of Patent: Oct. 8, 2002

(54) POWER SAVING METHOD AND APPARATUS FOR RADIO BASE STATION

(75) Inventor: Katsuya Nagashima, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/181,166

(22) Filed: Oct. 28, 1998

(30) Foreign Application Priority Data

Oct. 28, 1997 (JP) ............................................ 9-295302

(51) Int. Cl.[7] .............................................. H04B 7/212
(52) U.S. Cl. ...................... 370/347; 370/311; 370/337; 455/343; 455/574
(58) Field of Search ................................ 370/347, 442, 370/458–459, 311, 350, 510, 337, 280, 282, 294; 455/343, 574

(56) References Cited

U.S. PATENT DOCUMENTS

| 4,509,199 A | * | 4/1985 | Ichihara .......................... 455/7 |
| 4,577,315 A | * | 3/1986 | Otsuka .......................... 370/95 |
| 4,903,319 A | * | 2/1990 | Kasai et al. .................. 455/33 |
| 4,964,121 A | * | 10/1990 | Moore ...................... 370/100.1 |
| 5,594,735 A | * | 1/1997 | Jokura .......................... 370/337 |
| 5,666,355 A | * | 9/1997 | Huah et al. .................. 370/311 |
| 5,678,227 A | * | 10/1997 | Connell et al. ............. 455/343 |
| 5,812,936 A | * | 9/1998 | DeMont ....................... 455/63 |
| 5,999,830 A | * | 12/1999 | Taniguchi et al. ........ 4555/337 |

FOREIGN PATENT DOCUMENTS

| JP | 7-508867 | 9/1995 |
| JP | 7-322331 | 12/1995 |
| JP | 9-116948 | 5/1997 |
| JP | 9-200308 | 7/1997 |

\* cited by examiner

Primary Examiner—Douglas Olms
Assistant Examiner—Van Nguyen
(74) Attorney, Agent, or Firm—Scully, Scott, Murphy & Presser

(57) ABSTRACT

In a radio base station of a TDMA communications system, an occupied time slot is discriminated from an idle time slot in a frame to produce a discrimination signal. A power control signal for a receiver is switched between a first state and a second state in time slots depending on the discrimination signal. The power control signal is switched to the first state at timing of the occupied time slot and to the second state at timing of the idle time slot.

16 Claims, 3 Drawing Sheets

POWER SAVING METHOD AND APPARATUS FOR RADIO BASE STATION

BACKGROUND OF THE INVENTION

1. Field of the Invention

The present invention relates to a radio mobile communications system using the time-division multiple-access (TDMA) scheme and, more specifically, to a power saving technique for use in a radio base station in the radio communications system.

2. Description of the Related Art

The time-division multiple-access/time-division duplex (TDMA/TDD) scheme is a form of TDMA scheme and is advantageous where frequency management is readily made and transmitting/receiving is performed without the need of a pair of frequency bands or a diplexer because alternating time slots on the same carrier signal are assigned to the forward and reverse directions of communication. A further advantage of the TDMA/TDD scheme is that diversity can be made only at the side of a base station. The TDMA/TDD scheme has been used in Japan for personal handy-phone system (PHS) and in Europe for the digital European cordless telephone (DECT).

In a radio mobile communications system, power saving control is necessary for radio base stations and mobile terminals. Since power consumption for transmitting radio signals is usually large, there have been proposed several transmission power control methods.

For example, a transmission power controller has been disclosed in Japanese Patent Unexamined Publication No. 7-336291. The transmission power control is performed depending on both the bit error rate and the electric field level of a received signal. More specifically, the transmission power is reduced when the bit error rate is lower than a threshold or when the received electric field level is greater than a threshold.

However, it is difficult to further reduce in power in the case of diversity-combining base station or high-traffic base station. The diversity-combining base station needs a plurality of receiving branches for diversity combining and the high-traffic base station needs a plurality of radio transceivers to cope with high volumes of traffic. Therefore, the power consumption required for receiver circuits forms an increased proportion of the entire power consumption of the base station and further reduced power consumption cannot be achieved by controlling the transmission power consumption only.

The base station with a large amount of power consumption would rapidly run out a backup battery in the event of a power failure and further lead to increased heat generation.

SUMMARY OF THE INVENTION

The inventor found that it still has plenty of room for reduction in power consumption of a base station from the viewpoint of receiving operation in the TDMA scheme.

An object of the present invention is to provide power saving method and apparatus that can achieve a substantial reduction in total power consumption of a radio base station.

According to an aspect of the present invention, in a mobile communications system using a time-division multiple-access (TDMA) format, an occupied time slot is discriminated from an idle time slot in a frame to produce a discrimination signal. A power control signal for a receiver is switched between a first state and a second state in time slots depending on the discrimination signal. The power control signal is switched to the first state at timing of the occupied time slot and to the second state at timing of the idle time slot.

According to another aspect of the present invention, a radio base station includes a radio section including a plurality of receivers and a power supply for supplying power to the radio section. Further, it is provided with a discriminator for discriminating between an occupied time slot and an idle time slot in a frame to produce a discrimination signal and a controller for switching a power control signal between a first state and a second state in time slots depending on the discrimination signal, wherein the power control signal causes the power supply to operate.

Each of the receivers may include an analog signal section including a radio-frequency amplifier for amplifying a radio-frequency analog signal, a frequency converter for converting the radio-frequency analog signal to an intermediate-frequency analog signal by mixing it with a local oscillation signal, and an intermediate-frequency amplifier for amplifying the intermediate-frequency analog signal, a frequency synthesizer for generating the local oscillation signal, and a modem section including a demodulator for demodulating the high-frequency analog signal to produce a digital signal and a decoder for decoding the digital signal to produce received data.

The controller switches the power control signal to the first state at timing of the occupied time slot and switches the power control signal to the second state at timing of the idle time slot. The first state causes the receiver to be powered on and the second state causes the analog signal section of the receiver to be powered off and the frequency synthesizer and the modem section to be in a standby mode.

As described above, since each receiver of the radio base station is subjected to power switching control in time slots depending on the discrimination signal, the total power consumption of the radio base station can be reduced compared with the prior art. Such reduction In power consumption causes the backup battery to be prevented from rapidly exhausted in the event of a power failure. Further the reduction in power consumption also decreases heat generation.

DESCRIPTION OF THE PREFERRED EMBODIMENTS

Figure 1:
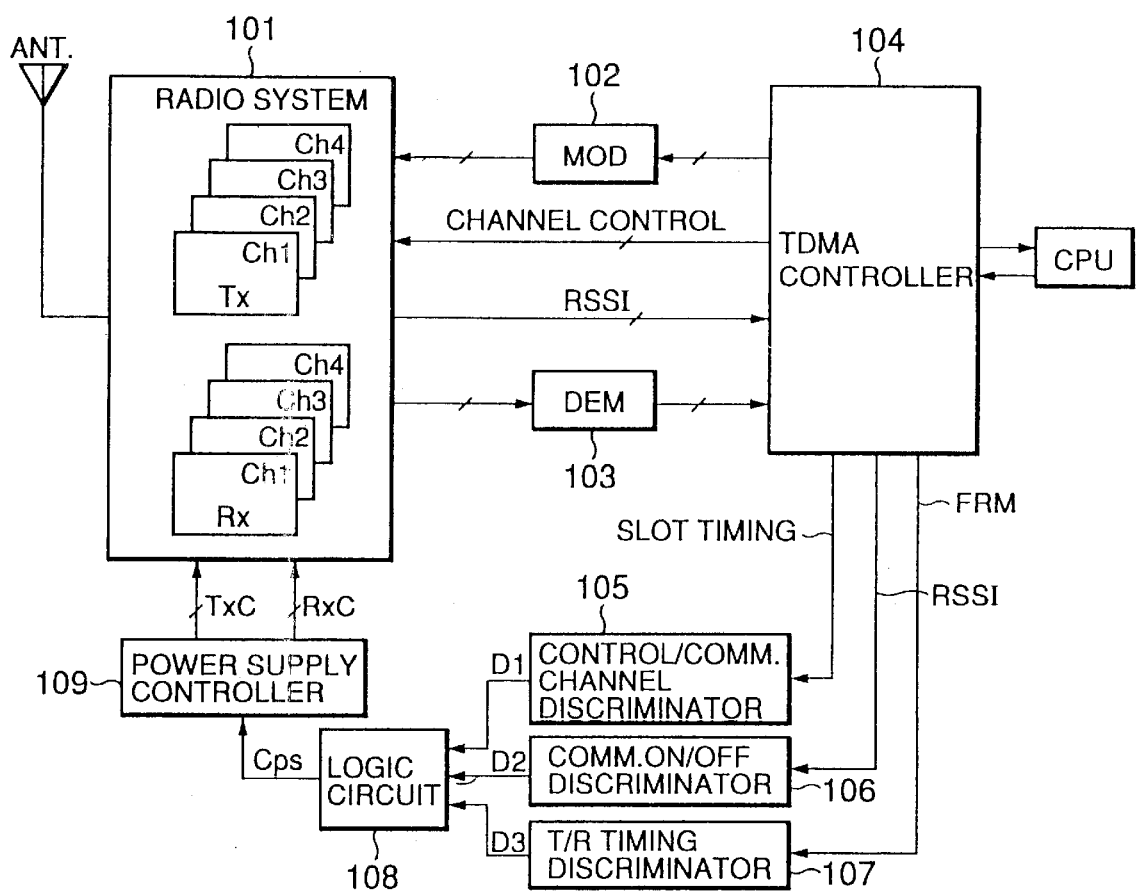
FIG. 1 is a block diagram showing a power saving circuit used in a transceiver according to an embodiment of the present invention.

Referring to FIG. 1, a radio base station is provided with a radio system 101 including a plurality of transmitters and receivers, which are connected to an antenna. In this embodiment, a pair of transmitter and receiver is provided for each of four channels ch1–ch4. Each transmitter Tx transmits a radio-frequency signal of the corresponding channel generated from an intermediate-frequency signal input from a modulator 102. Each receiver Rx receives a radio-frequency signal and converts it to an intermediate-frequency signal to output it to a demodulator 103. Further, each receiver Rx of the radio system 101 outputs a received-signal strength signal RSSI of the corresponding channel to a TDMA controller 104. The TDMA controller 104 performs the TDMA/TDD control of the radio base station under the control of a processor (CPU).

The radio base station is further provided with a control/communication channel discriminator 105, a communication ON/OFF discriminator 106, a transmit/receive timing discriminator 107 and a logic circuit 108, which forms a power-supplied slot discriminator for each channel.

The control/communication channel discriminator 105 discriminates between a control channel and a communication channel based on a receiving frequency and outputs a discrimination signal D1. As known well, a control slot of the control channel is used in link channel establishment phase and service channel establishment phase. A necessary control signal is transferred at the predetermined timing of the control slot. Here, the control slot is assigned to the first slots of the transmitting and receiving time periods, respectively. Therefore, each receiver receives the control signal at regular intervals. When receiving on the control channel, the discrimination signal D1 is in logical high. When receiving on the communication channel, the discrimination signal D1 is in logical low.

The communication ON/OFF discriminator 106 discriminates between the presence and absence of communication at each communication slot based on the magnitude of the received signal strength RSSI and outputs a discrimination signal D2. When the received signal strength RSSI is equal to or greater than a predetermined threshold level at a communication slot, it is determined that communication is being performed at the communication slot and therefore the discrimination signal D2 is in logical high. When the received signal strength RSSI is smaller than the predetermined threshold level at a communication slot, it is determined that communication is not performed at the communication slot, that is, this communication slot is idle. In this case, the discrimination signal D2 is in logical low.

The transmit/receive timing discriminator 107 discriminates between the transmit timing and the receive timing based on a frame timing signal FRM and outputs a discrimination signal D3. Since the first four slots are assigned to transmission and the remaining four slots to reception in a TDMA/TDD frame, the transmit/receive timing discriminator 107 may be formed by a logic circuit and a timer counter operating at the frame timing signal FRM. The discrimination signal D3 is in logical low during transmitting periods and it is in logical high during receiving periods.

The control/communication channel discriminator 105 and the communication ON/OFF discriminator 106 are preferably implemented with software. For example, such discrimination functions can be implemented by a program-controlled processor running the corresponding programs. Alternatively, the TDMA controller 104 may includes these functions.

The respective discrimination signals D1, D2 and D3 are output to a logic circuit 108. The logic circuit 108 determines whether power should be supplied to a receiver and a transmitter of the radio system 101 depending on the discrimination signals D1, D2 and D3. More specifically, the logic circuit 108 has the logic function defined as the state of an output $C_{PS}$ for all possible discrimination signals D1, D2 and D3 during the receiving periods as shown in the following table.

TABLE

| D1 | D2 | D3 | $C_{PS}$ |
|----|----|----|----------|
| 1  | 0  | 1  | 1        |
| 0  | 0  | 1  | 0        |
| 0  | 1  | 1  | 1        |

A power supply controller 109 inputs the output $C_{PS}$ of the logic circuit 108 for each channel and outputs a pair of transmitter and receiver power supply control signals, TxC and RxC, to the radio system 101. According to the power supply control signals TxC and RxC, a power supply (not shown) supplies power to the corresponding transmitter and receiver of the radio system 101. More specifically, in the case of $C_{PS}=1$, power is supplied to the corresponding receiver to perform the receiving operation at the slot. In the case of $C_{PS}=0$, power is not supplied to the corresponding receiver. Therefore, further reduced power consumption can be achieved.

In this embodiment, each receiver includes an analog section composed of a radio-frequency amplifier, a mixer and an intermediate-frequency amplifier. As described later, it may include the demodulator 103 and further a decoder unless any failure occurs when switching on and off in time slots.

Figure 2:
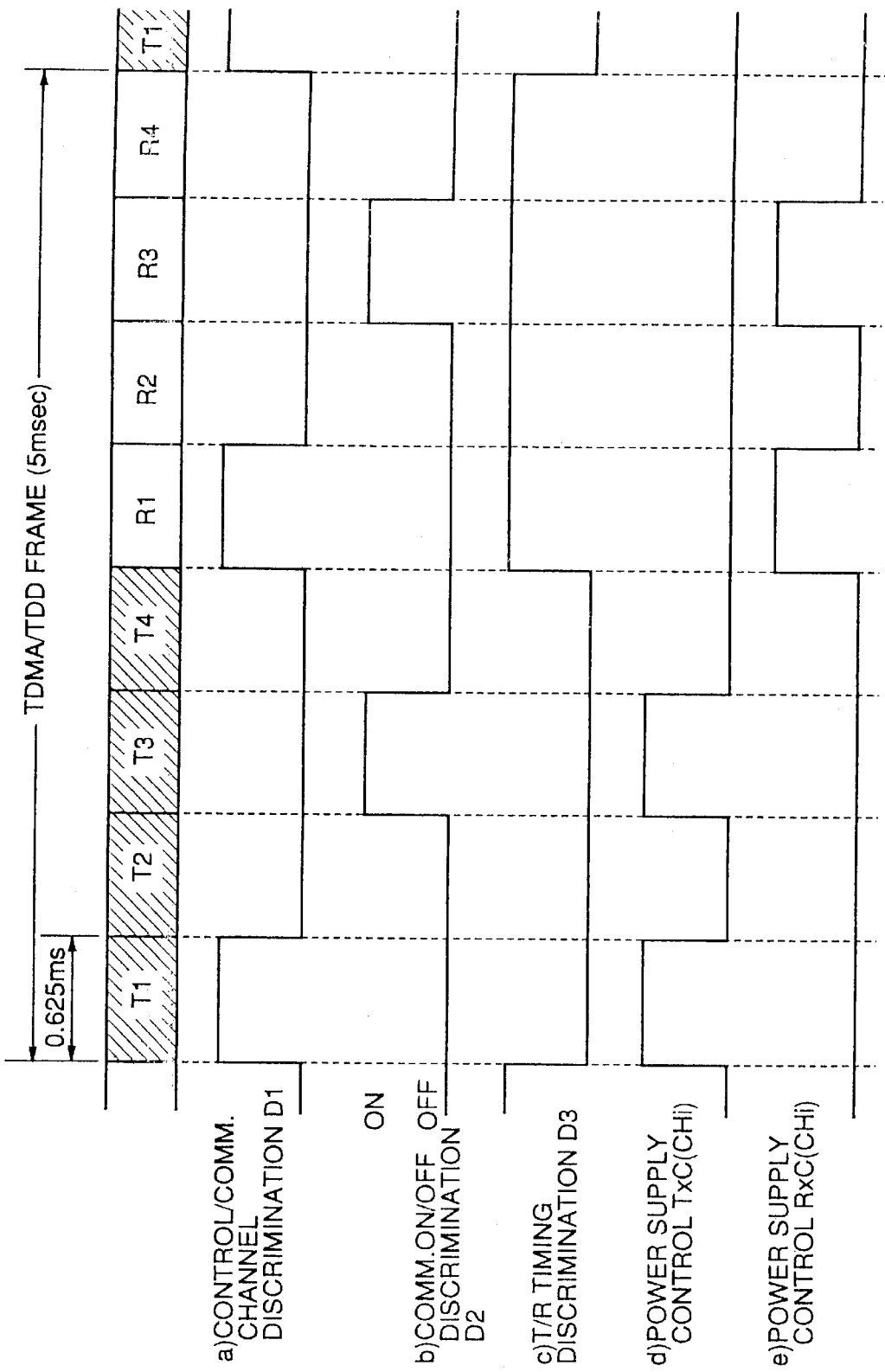
FIG. 2 is a diagram showing an operation of the power saving circuit in TDMA/TDD frames according to the embodiment.

Referring to FIG. 2, a TDMA/TDD frame of 5 msec is composed of eight time slots each of 0.625 msec consisting of 240 bits. The firs four time slots T1–T4 are assigned to transmission and the last four time slots R1–R4 to reception. Further, the time slots T1 and R1 are used as control slot for the control channel and the remaining time slots T2–T4 and R2–R4 are used for communication channel. The control slot includes preamble, channel identification, source identification code, destination identification code and other necessary information. The communication slot includes preamble, channel identification, user data, and other necessary information.

Assuming that the third time slots R3 are assigned for communication of channel CHi. The control/communication channel discrimination signal D1 changes to logical high at the timing of the control slot R1 as shown in FIG. 2(a). The communication ON/OFF discrimination signal D2 changes to logical high at the timing of the time slot R3 as shown in FIG. 2(b). Since the T/R timing discrimination signal D3 is in logical high during the receiving period as shown in FIG. 2(c), the output $C_{PS}$ of the logic circuit 108 changes to logical high at the timing of time slots R1 and R3 according to the logic function as described in the above table.

Therefore, the power supply control signal RxC for the channel changes to logical high and power is supplied to the corresponding to the receiver at the same timing as the output $C_{PS}$ of the logic circuit 108 as shown in FIG. 2(e). In other words, power is supplied to the receiver only when the output $C_{PS}$ of the logic circuit 108 changes to logical high. More generally, each receiver of the radio system 101 switches on and off in time slots according to the output $C_{PS}$ of the logic circuit 108, resulting in reduced power consumption of the radio base station.

Figure 3:
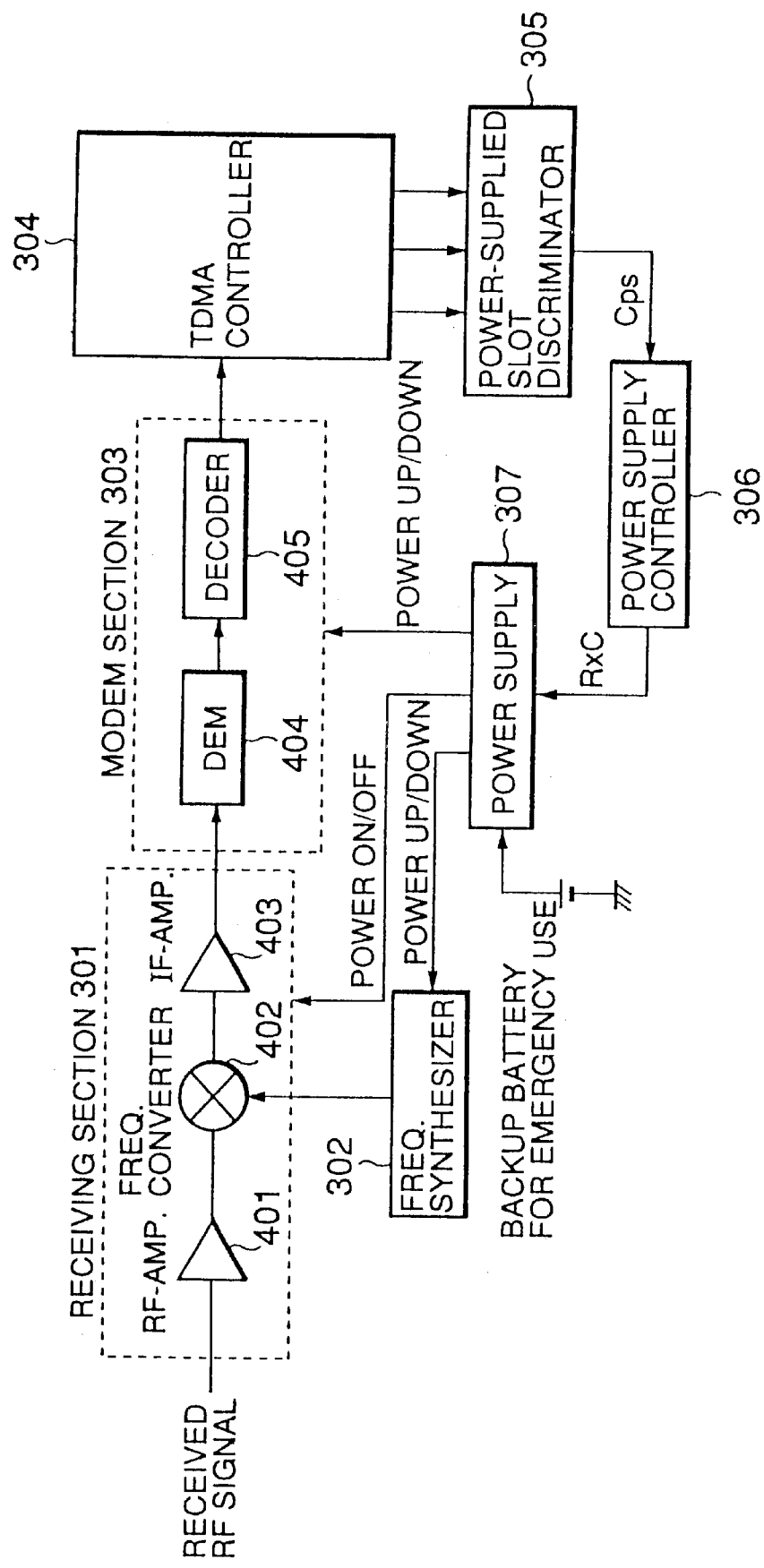
FIG. 3 is a schematic diagram showing a receiver section according to another embodiment of the present invention.

Referring to FIG. 3, each receiver Rx of the radio system 101 includes a receiving section 301, a frequency synthesizer 302 and a modem section 303. In this embodiment, the receiving section 301 is subjected to power ON/OFF control and the frequency synthesizer 302 and the modem section 303 are subjected to power up/down control.

The receiving section 301 converts a radio-frequency signal to an intermediate-frequency signal and output it to the modem section 303. The modem section 303 outputs digital received data to a TDMA controller 304 that is the same as in FIG. 1.

The receiver Rx is provided with a power-supplied slot discriminator 305 for each channel, that is composed of the control/communication channel discriminator 105, the communication ON/OFF discriminator 106, the transmit/receive timing discriminator 107 and the logic circuit 108, as shown in FIG. 1. The output $C_{PS}$ of the power-supplied slot discriminator 305 causes a power supply controller 306 to generate a receiver power supply control signal RxC. According to the power supply control signal RxC, the power supply 307 supplies power to the receiving section 301, the frequency synthesizer 302 and the modem section 303. The power supply 307 is further provided with a backup battery for emergency use.

The receiving section 301 is powered on and off according to the power supply control signal RxC. The frequency synthesizer 302 and the modem section 303 are powered up and down according to the same power supply control signal RxC. When powered up, they are normally powered and, when powered down, they change to a standby state.

More specifically, the receiving section 301 is composed of a radio-frequency amplifier 401, a mixer 402 and an intermediate-frequency amplifier 403. The radio-frequency amplifier 401 amplifies the received RF signal and the mixer 402 mixes the received RF signal with a local oscillation signal generated by the frequency synthesizer 302 to produce the intermediate-frequency signal. In other words, the mixer 402 is a frequency converter. The Intermediate-frequency amplifier 403 amplifies the intermediate-frequency signal and then outputs it to the modem section 303. These circuit components 401–403 are allowed to switch on and off in time slots. An antenna switch circuit and an RSSI detecting circuit, which are not shown, may be included in the receiving section 301.

The modem section 303 is composed of a demodulator 404 and a decoder 405. The frequency synthesizer 302, the demodulator 404 and the decoder 405 are powered up and down according to the power supply control signal RxC. When powered down, predetermined idle currents flow through the frequency synthesizer 302, the demodulator 404 and the decoder 405, respectively, to be promptly started. Therefore, the reduced power consumption is achieved as in the case of power ON/OFF.

Usually, the frequency synthesizer 302 is used for both transmission and reception. Therefore, from the viewpoint of practical use, it is preferable that the frequency synthesizer 302 is not powered on and off but up and down.

Contrarily, it is possible that the receiving section 301, the frequency synthesizer 302 and the modem section 303 are all powered up and down according to the power supply control signal RxC.

The power-supplied slot discriminator 305 composed of the control/communication channel discriminator 105, the communication ON/OFF discriminator 106, the transmit/receive timing discriminator 107 and the logic circuit 108 is preferably implemented with software and/or large-scale integration.

The present invention can be applied to TDMA scheme not limited only to TDMA/TDD format.

According to the present invention, since each receiver of the radio base station is powered on/off or up/down in time slots depending on the output signal $C_{PS}$ of the power-supplied slot discriminator, the total power consumption of the radio base station can be reduced compared with the prior art. Such reduction in power consumption causes the backup battery to be prevented from rapidly exhausted in the event of a power failure. Further, the reduction in power consumption decreases heat generation.

What is claimed is:

1. A power saving method for a radio base station in a mobile communications system using a time-division multiple-access (TDMA) format, comprising the steps of:
   a) discriminating between an occupied time slot and an idle time slot in a frame to produce a discrimination signal; and
   b) switching a power control signal for a receiver between a first state and a second state in time slots depending on the discrimination signal;
   wherein the mobile communications system uses a multichannel time-division multiple-access/time-division duplex (TDMA/TDD) format and the radio base station is comprised of a plurality of pairs of receiver and transmitter corresponding to different channels, wherein the step a) comprises the steps of,
   discriminating between a control channel and a communication channel based on the TDMA/TDD format to produce a first discrimination signal;
   discriminating between presence and absence of communication based on a received-signal strength for each time slot to produce a second discrimination signal;
   discriminating between transmission timing and reception timing based on the TDMA/TDD format to produce a third discrimination signal; and
   calculating the discrimination signal from the first to third discrimination signals.

2. The power saving method according to claim 1, wherein the step b) comprises the steps of:
   switching the power control signal to the first state at timing of the occupied time slot; and
   switching the power control signal to the second state at timing of the idle time slot.

3. The power saving method according to claim 2, wherein the first state causes the receiver to be powered on and the second state causes the receiver to be powered off.

4. The power saving method according to claim 2, wherein the first state causes the receiver to be powered on and the second state causes the receiver to be in a standby mode.

5. A power saving apparatus for a radio base station in a mobile communications system using a time-division multiple-access (TDMA) format, comprising:
   a discriminator for discriminating between an occupied time slot and an idle time slot in a frame to produce a discrimination signal; and
   a controller for switching a power control signal for the receiver between a first state and a second state in time slots depending on the discrimination signal;
   wherein the mobile communications system uses a multichannel time-division multiple-access/time-division duplex (TPMA/TDD) format and the radio base station is comprised of a plurality of pairs of receiver and transmitter corresponding to different channels, wherein the discriminator comprises:
   a first discriminator for discriminating between a control channel and a communication channel based on the TDMA/TDD format to produce a first discrimination signal;
   a second discriminator for discriminating between presence and absence of communication based on a received-signal strength for each time slot to produce a second discrimination signal;

a third discriminator for discriminating between transmission timing and reception timing based on the TDMA/TDD format to produce a third discrimination signal; and a logic calculator for calculating the discrimination signal from the first to third discrimination signals.

6. The power saving apparatus according to claim 5, wherein the controller switches the power control signal to the first state at timing of the occupied time slot and switches the power control signal to the second state at timing of the idle time slot.

7. The power saving apparatus according to claim 5, wherein the first state causes the receiver to be powered on and the second state causes the receiver to be powered off.

8. The power saving apparatus according to claim 5, wherein the first state causes the receiver to be powered on and the second state causes the receiver to be in a standby mode.

9. A radio base station in a mobile communications system using a time-division multiple-access (TDMA) format, comprising:

a radio section including a plurality of receivers;

a power supply for supplying power to the radio section;

a discriminator for discriminating between an occupied time slot and an idle time slot in a frame to produce a discrimination signal; and a controller for switching a power control signal between a first state and a second state in time slots depending on the discrimination signal, wherein the power control signal causes the power supply to operate;

wherein the mobile communications system uses a multichannel time-division multiple-access/time-division duplex (TPMA/TDD) format and the radio base station is comprised of a plurality of pairs of receiver and transmitter corresponding to different channels, wherein the discriminator comprises:

a first discriminator for discriminating between a control channel and a communication channel based on the TDMA/TDD format to produce a first discrimination signal;

a second discriminator for discriminating between presence and absence of communication based on a received-signal strength for each time slot to produce a second discrimination signal;

a third discriminator for discriminating between transmission timing and reception timing based on the TDMA/TDD format to produce a third discrimination signal; and a logic calculator for calculating the discrimination signal from the first to third discrimination signals.

10. The radio base station according to claim 9, wherein the controller switches the power control signal to the first state at timing of the occupied time slot and switches the power control signal to the second state at timing of the idle time slot.

11. The radio base station according to claim 10, wherein the first state causes the receiver to be powered on and the second state causes the receiver to be powered off.

12. The radio base station according to claim 10, wherein the first state causes the receiver to be powered on and the second state causes the receiver to be in a standby mode.

13. The radio base station according to claim 9, wherein each of the receivers comprises:

an analog signal section including a radio-frequency amplifier for amplifying a radio-frequency analog signal, a frequency converter for converting the radio-frequency analog signal to an intermediate-frequency analog signal by mixing it with a local oscillation signal, and an intermediate-frequency amplifier for amplifying the intermediate-frequency analog signal;

a frequency synthesizer for generating the local oscillation signal; and a modem section including a demodulator for demodulating the high-frequency analog signal to produce a digital signal and a decoder for decoding the digital signal to produce received data, wherein the controller switches the power control signal to the first state at timing of the occupied time slot and switches the power control signal to the second state at timing of the idle time slot.

14. The radio base station according to claim 13, wherein the first state causes the receiver to be powered on; and the second state causes the analog signal section of the receiver to be powered off and the frequency synthesizer and the modem section to be in a standby mode.

15. The power saving apparatus according to claim 5, wherein the receiver comprises:

an analog signal section including a radio-frequency amplifier for amplifying a radio-frequency analog signal, a frequency converter for converting the radio-frequency analog signal to an intermediate-frequency analog signal by mixing it with a local oscillation signal, and an intermediate-frequency amplifier for amplifying the intermediate-frequency analog signal:

a frequency synthesizer for generating the local oscillation signal: and a modem section including a demodulator for demodulating the high-frequency analog signal to produce a digital signal and a decoder for decoding the digital signal to produce received data, wherein the controller switches the power control signal to the first state at timing of the occupied time slot and switches the power control signal to the second state at timing of the idle time slot.

16. The power saving apparatus according to claim 15, wherein the first state causes the receiver to be powered on; and the second state causes the analog signal section of the receiver to be powered off and the frequency synthesizer and the modem section to be in a standby mode.

* * * * *